(12) United States Patent
Satoh

(10) Patent No.: US 6,724,499 B1
(45) Date of Patent: Apr. 20, 2004

(54) PSEUDO HALFTONE IMAGE EXPRESSION METHOD

(75) Inventor: Takeshi Satoh, Tokyo (JP)

(73) Assignee: Mutoh Industries Ltd., Tokyo (JP)

( * ) Notice: Subject to any disclaimer, the term of this patent is extended or adjusted under 35 U.S.C. 154(b) by 0 days.

(21) Appl. No.: 09/386,059

(22) Filed: Aug. 30, 1999

(30) Foreign Application Priority Data

Aug. 31, 1998 (JP) .......................................... 10-245350

(51) Int. Cl.$^7$ .......................... G06K 15/00; G06K 9/38; H04N 1/405
(52) U.S. Cl. ...................... 358/1.9; 358/3.06; 358/3.13; 358/3.17; 358/3.18; 358/3.19; 382/270
(58) Field of Search ................................ 358/1.9, 3.01, 358/3.03, 3.06, 3.13, 3.16, 3.18, 3.19; 382/270, 271, 272, 273

(56) References Cited

U.S. PATENT DOCUMENTS

| | | | |
|---|---|---|---|
| 5,053,887 A | | 10/1991 | Thompson .................. 358/457 |
| 5,555,102 A | | 9/1996 | Dalton ........................ 358/456 |
| 5,557,709 A | * | 9/1996 | Shu ............................. 358/1.9 |
| 5,684,932 A | * | 11/1997 | Shu ............................. 358/1.9 |
| 5,703,695 A | | 12/1997 | Nguyen ....................... 358/298 |
| 5,706,105 A | * | 1/1998 | Naylor, Jr. ................. 358/3.23 |
| 5,760,920 A | * | 6/1998 | Lin et al. ..................... 358/3.2 |
| 5,917,951 A | * | 6/1999 | Thompson et al. ......... 382/237 |
| 6,020,978 A | * | 2/2000 | Cooper et al. ............... 358/1.9 |
| 6,025,930 A | * | 2/2000 | Thompson et al. .......... 358/1.9 |
| 6,172,773 B1 | * | 1/2001 | Ulichney .................... 358/3.13 |
| 6,266,155 B1 | * | 7/2001 | Lee et al. ................... 358/3.14 |
| 6,381,037 B1 | * | 4/2002 | Balasubramanian et al. ..... 358/3.23 |
| 6,433,891 B1 | * | 8/2002 | Yu et al. ....................... 358/1.9 |
| 6,445,465 B1 | * | 9/2002 | Samworth .................... 358/1.9 |
| 2002/0196454 A1 | * | 12/2002 | Atkins et al. ................ 358/1.9 |
| 2003/0035146 A1 | * | 2/2003 | Yu et al. ..................... 358/3.14 |

OTHER PUBLICATIONS

Ulichney, Robert A.; Void–and–cluster method for dither array generation, Sep. 1993, SPIE, Proceedings, col. 1913, p. 332–343.*

Caren Elicser, Colour Screening Technology: A Tutorial on the Basic Issues, Oct. 1991, "The Seybold Report on Desktop Publishing", vol. 6, No. 2.*

* cited by examiner

*Primary Examiner*—Kimberly A. Williams
*Assistant Examiner*—Melanie Vida
(74) *Attorney, Agent, or Firm*—Knoble Yoshida & Dunleavy

(57) ABSTRACT

There is provided a pseudo-halftone image expression method capable of processing vector data with an excellent image quality and small computational complexity. Gray levels of n×n/m are expressed by varying the number of formed dots within a matrix of n×n dots on an m-dot basis (where n denotes an integer of 8 or more and m denotes an integer of 4 or more). A dot formation rule corresponding to each gray level within a matrix is divided into at least two stages, form a low gray level to a high gray level. In a first stage, dots are arranged at random and in dispersion so as to separate a dot from each other. In a second stage, dots are extended in random directions in turn so as to prevent an island of successive dots from coupling with each other using the dots arranged at the first stage as a nucleus.

5 Claims, 5 Drawing Sheets

| ◎ | 1 | 2 | 3 | 4 | 5 | 6 | 7 | 8 |
|---|---|---|---|---|---|---|---|---|
| 1 | 2 | 3 | 4 | 5 | 6 | 7 | 8 | 9 |
| 2 | 3 | 4 | 5 | 6 | 7 | 8 | 9 | 10 |
| 3 | 4 | 5 | 6 | 7 | 8 | 9 | 10 | 11 |
| 4 | 5 | 6 | 7 | 8 | 9 | 10 | 11 | 12 |
| 5 | 6 | 7 | 8 | 9 | 10 | 11 | 12 | 13 |
| 6 | 7 | 8 | 9 | 10 | 11 | 12 | 13 | 14 |
| 7 | 8 | 9 | 10 | 11 | 12 | 13 | 14 | 15 |
| 8 | 9 | 10 | 11 | 12 | 13 | 14 | 15 | 16 |

THE NUMBER OF STEPS WHEN ADVANCING IN LENGTH AND WIDTH

FIG. 5B

| ◎ | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 2 | 2 | 3 | 4 | 5 | 6 | 7 | 8 |
| 3 | 3 | 3 | 3 | 4 | 5 | 6 | 7 | 8 |
| 4 | 4 | 4 | 4 | 4 | 5 | 6 | 7 | 8 |
| 5 | 5 | 5 | 5 | 5 | 5 | 6 | 7 | 8 |
| 6 | 6 | 6 | 6 | 6 | 6 | 6 | 7 | 8 |
| 7 | 7 | 7 | 7 | 7 | 7 | 7 | 7 | 8 |
| 8 | 8 | 8 | 8 | 8 | 8 | 8 | 8 | 8 |

THE NUMBER OF STEPS WHEN ADVANCING IN LENGTH, WIDTH AND OBLIQUE

FIG. 5C

| ◎ | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 2 | 2 | 3 | 4 | 5 | 6 | 7 | 8 |
| 3 | 3 | 3 | 4 | 5 | 5 | 6 | 7 | 8 |
| 4 | 4 | 4 | 5 | 5 | 6 | 7 | 8 | 8 |
| 5 | 5 | 5 | 5 | 6 | 7 | 7 | 8 | 9 |
| 6 | 6 | 6 | 6 | 7 | 7 | 8 | 9 | 10 |
| 7 | 7 | 7 | 7 | 8 | 8 | 9 | 9 | 10 |
| 8 | 8 | 8 | 8 | 8 | 9 | 10 | 10 | 11 |

EUCLID'S DISTANCE

FIG. 8A
PRIOR ART

| 1 | 13 | 4 | 16 |
|---|----|---|----|
| 9 | 5 | 12 | 8 |
| 3 | 15 | 2 | 14 |
| 11 | 7 | 10 | 6 |

BAYER TYPE

FIG. 8B
PRIOR ART

| 1 | 3 | 14 | 16 |
|---|---|----|----|
| 9 | 11 | 6 | 8 |
| 13 | 15 | 2 | 4 |
| 5 | 7 | 10 | 12 |

MESH TYPE

FIG. 8C
PRIOR ART

| 7 | 8 | 9 | 10 |
|---|---|---|----|
| 6 | 1 | 2 | 11 |
| 5 | 4 | 3 | 12 |
| 16 | 15 | 14 | 13 |

WHIRLPOOL TYPE

PSEUDO HALFTONE IMAGE EXPRESSION METHOD

BACKGROUND OF THE INVENTION

1. Field of the Invention

The present invention relates to a pseudo-halftone image expression method for use in expressing such an image having halftones as a black-white and color photograph gradually with binary dots.

2. Description of the Related Art

In case of four basic colors of cyanic, magenta, yellow and black, a raster plotter can merely express seven total colors including mixed colors of red, green and blue thereof in addition to the four colors. It can not express more than eight colors even though a ground color of white is additionally included. Various methods have been developed, however, to create pseudo halftones in the art. Generally known methods include a pattern dither method which realizes a pseudo halftone expression by distributing thresholds for binarization into a matrix of 4×4 dots, for example, and increasing the number of formed dots in accordance with gray levels. FIG. 8 exemplifies some threshold matrixes. FIGS. 8A–8C respectively illustrate the threshold matrixes of a Bayer type, mesh type and whirlpool type.

The pattern dither method can advantageously realize the pseudo halftone expression with a relatively simple algorithm, high-speed processing and small computation complexity. It has a disadvantage, however, that a coarse image quality is remarkable such that the same pattern is seen repeatedly, for example.

There are other methods suitable for processing a full color image such as a photograph in general while their algorithms are more sophisticated and their computational complexities are larger than those of the pattern dither method that tries to realize the pseudo halftone expression with a simple algorithm. An error diffusion method represents such methods. This method replaces a subject dot with the nearest basic color or a mixed color thereof and compensates an error, which is caused relative to the original color by the replacement, at a later color replacement.

The error diffusion method, on the other hand performs a fine compensation on a dot basis and thus enables the pseudo halftone expression to be processed with a relatively higher image quality. It has a disadvantage, however, that its computation complexity becomes enormous because of the error compensation computing on a dot basis. The error diffusion method also has other disadvantages that the compensation cannot be achieved until the errors are stored when a light color is painted out, and that the compensation cannot over take an image with a sharp density variation and degrades the image quality extremely. In addition, the method is difficult for use in processing vector data while it is effective for raster data and the like because the computation is achieved along with scanning.

SUMMARY OF THE INVENTION

The present invention has been made in consideration of such the disadvantages and accordingly has an object to provide a pseudo-halftone image expression method capable of processing vector data with a high image quality and small computational complexity.

The present invention is provided with a pseudo-halftone image expression method for expressing gray levels of n×n/m by varying the number of formed dots within a matrix of n×n dots on an m-dot basis (where n denotes an integer of 8 or more and m denotes an integer of 4 or more). A dot formation rule corresponding to each gray level within a matrix is divided into at least two stages, from a low gray level to a high gray level. In a first stage, dots are arranged at random and in dispersion so as to separate a dot from each other. In a second stage, dots are extended in random directions in turn so as to prevent an island of successive dots from coupling with each other using the dots arranged at the first stage as a nucleus.

A factor for degrading the image quality according to the conventional pattern dither method is a remarkable texture noise. This is caused by regular increase of the dots both in length and width within the matrix in accordance with the variation of the gray levels from a low level to a high level. Another factor for degrading the image quality is an irregular dense pattern that appears at a portion where a mass of dots joins with each other when the gray level varies from a certain level to a next level and the number of dots increases.

According to the present invention, the number of formed dots within the matrix is varied on a multi-dot basis in accordance with gray level variations. In addition, the dots are arranged at random and in dispersion at the first stage so as to separate a dot from each other. The dots are also extended in random directions in turn at the second stage so as to prevent the island of successive dots from coupling with each other. Thus, a smooth and excellent image can be obtained without any regular arrangement and local concentration of dots. The method of the present invention employs a fixed pattern system in accordance with gray levels. Thus, it is possible to realize a high-speed processing without such the computation on a dot basis as is performed in the error diffusion method and to process vector data easily as well.

Due to the following reason, n is defined with an integer of 8 or more. If n is less than 8, it becomes difficult to arrange plural dots within the matrix at random and in dispersion and also to express gradually in accordance with an island growth, resulting in the regular noise and irregular dense.

According to a preferred embodiment of the present invention, a third stage may be provided following to the second stage as a dot formation rule corresponding to gray levels within a matrix. In the third stage, a new dot that does not couple to each island is arranged before an island of different dots formed at the second stage is coupled to each other. Then, dots are extended from a low gray level to a high gray level in turn using the new dot as a nucleus. Thus, an extreme dense variation due to a linkage between islands can be avoided and a further smooth and excellent image can be obtained.

According to another preferred embodiment of the present invention, a half dot formation pattern in lower gray levels among the whole gray levels to be expressed may be stored. Then, another half dot formation pattern in higher gray levels may be determined as an inverted pattern of the dot formation pattern in the lower gray levels. Thus, it is possible to reduce a data amount of the pattern to be stored down to half the original storage amount. As a result, a time for obtaining the pattern and memory capacity for storing the pattern can be reduced by half.

According to further preferred embodiment of the present invention, a position of the dot to be arranged within the matrix at the first stage may be determined by arranging a plurality of dots at random within the matrix, and repeating predetermined times a process of moving each dot so as to be separated from the nearest dot by a predetermined distance. In addition, a position of the dot to be arranged within the matrix at the first stage may be determined to the emptiest position among dots already arranged.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 5A is a diagram illustrative of a distance computing method on generating the pattern;

FIG. 5B is a diagram illustrative of a distance computing method on generating the pattern;

FIG. 5C is a diagram illustrative of a distance computing method on generating the pattern;

FIG. 8A is a diagram illustrative of a conventional pattern dither method;

FIG. 8B is a diagram illustrative of a conventional pattern dither method; and

FIG. 8C is a diagram illustrative of a conventional pattern dither method.

DETAILED DESCRIPTION OF THE PREFERRED EMBODIMENTS

Preferred embodiments of the present invention will be described below with reference to the drawings.

Figure 1:
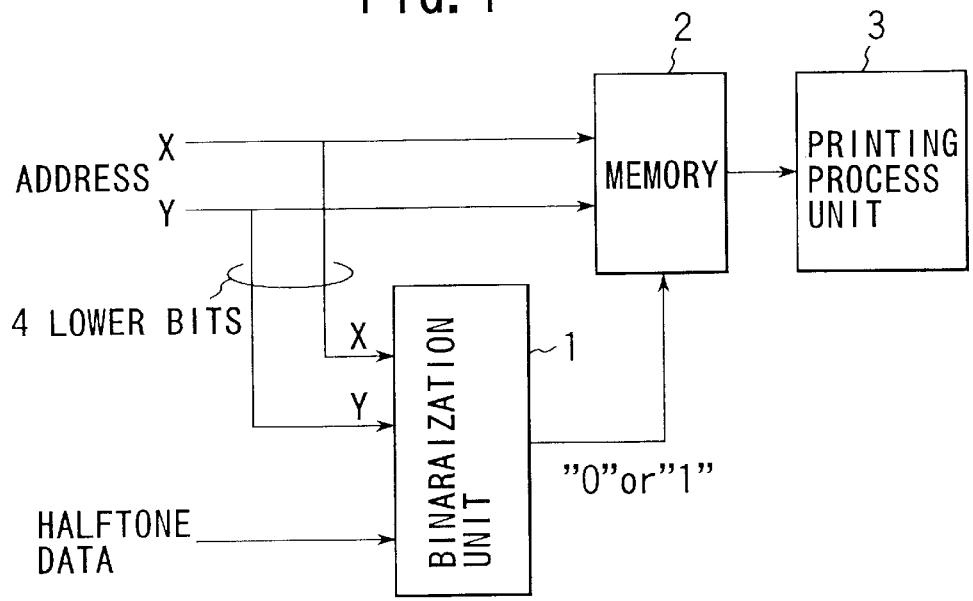
FIG. 1 is a block diagram showing an essential arrangement of a plotter according to an embodiment of the present invention.
Figure 2:
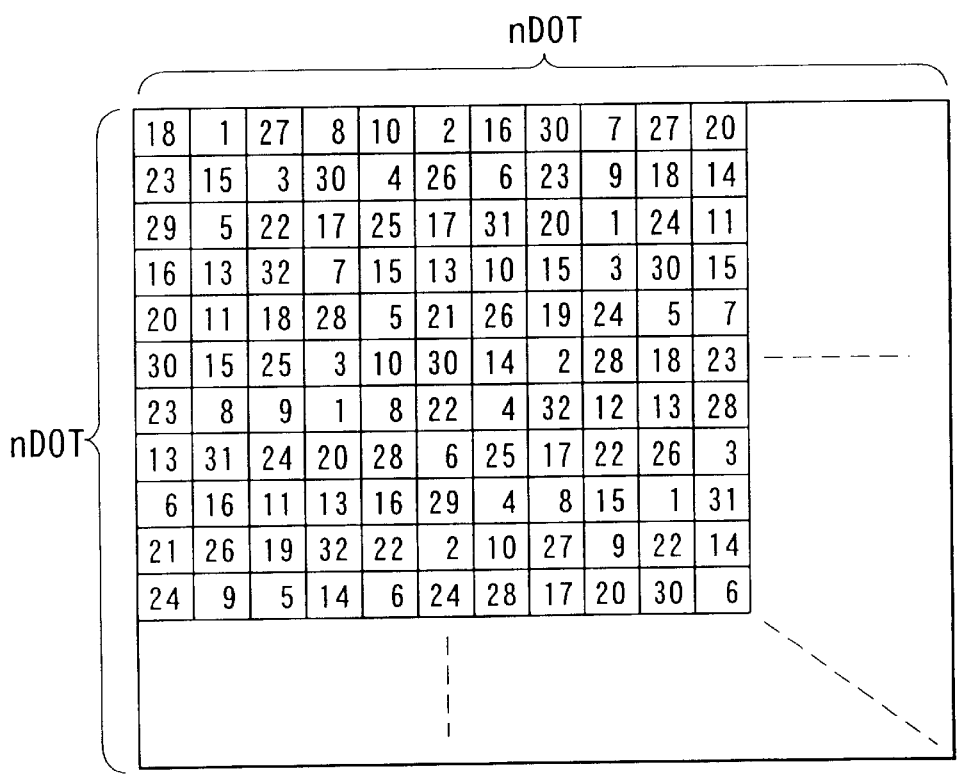
FIG. 2 is a diagram illustrative of a threshold pattern for use in a binarization unit in the embodiment.

FIG. 1 is a block diagram showing an arrangement of a plotter for realizing a pseudo-halftone image expression method according to the present invention. Halftone data read out from an un-depicted memory is fed into a binarization unit 1 along with addresses X and Y indicative of a printing position thereof. The addresses X and Y fed to the binarization unit 1 are indicative of a position within a matrix. If the matrix has a size of 16×16 dots, only 4 lower bits of the addresses are enough to feed into a binarization unit 1. The binarization unit 1 includes inside a ROM table for storing a threshold pattern as shown in FIG. 2, and compares a threshold at a dot position in the ROM table indicated by the addresses X and Y with the input halftone data. If "halftone data<threshold data," then the binarization unit 1 outputs "0." If "halftone data>/=threshold data,", it outputs "1." This binary output is stored in a memory 2 and then printed out from an inkjet head, thermal head or the like at a printing process unit 3.

A method for generating such the threshold pattern as shown in FIG. 2 and dots to be formed from the threshold pattern will be described next. It is assumed that the matrix size is 16×16 dots and the halftone levels are 0, 1, 2, . . . , 32. No dot is formed at the level 0, and 8 dots are formed at the level 1. Similarly, the number of dots increases by 8 when the level steps up one by one, and 256 dots are formed at the level 32. A process from the level 0 through the level 32 is divided into three stages including first, second and third stages from the lower level to which different dot formation rules are applied, respectively.

First Stage

Figure 3:
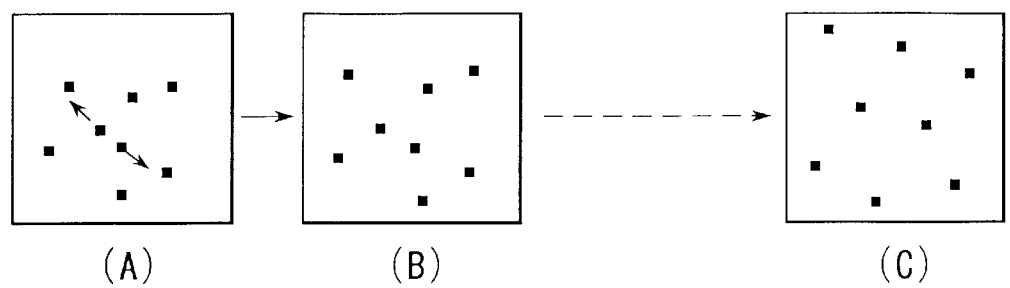
FIG. 3 is a diagram illustrative of a generating process of the pattern.

FIG. 3 is a diagram illustrating a method for determining positions of 8 dots at the level 1. Firstly, 8 dots are arranged at random within a matrix as shown in FIG. (A). Next, a process for "searching the nearest dot relative to a subject dot and then moving the subject dot so as to be separated from the nearest dot by one dot" is repeated several times. FIG. (B) schematically shows that one movement separates each dot from each other. FIG. (C) shows that 20-times movements arrange each dot at random in almost dispersion.

Figure 4A:
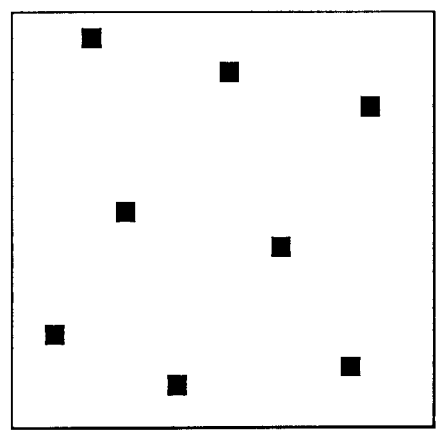
FIG. 4A is a diagram illustrative of a generating process of the pattern.
Figure 4B:
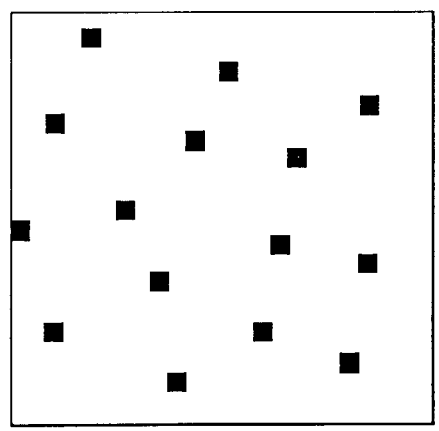
FIG. 4B is a diagram illustrative of a generating process of the pattern.

After 8 dots have been already arranged in dispersion as shown in FIG. 4A, next 8 dots are formed at emptier positions as far as possible so as not to be near the already arranged 8 dots as shown in FIG. 4B. An inversely proportional value of the square of a distance from another dot is employed at this time to search the emptiest position. If the matrix size is greater than this case, determining all dots for computation objects may increase the computation complexity enormously. Accordingly, in case of 128×128 dots, for instance, restricting a computation range within ±20 dots from the subject position may reduce the computation complexity.

There are several possible approaches for distance computing. FIG. 5A shows a method for advancing a dot (from the double-circled position at the upper left corner) in length and width one by one and determining a distance based on the number of the advanced dots. FIG. 5B shows another method for additionally counting the number of steps when a dot advances in an oblique direction by one dot. FIG. 5C shows a Euclid's distance method for faithfully reappearing a distance of a straight line connecting (the double-circled position) to each dot. The dots tend to align in the oblique direction according to the method of FIG. 5A while the dots tend to align in the length and width directions according to the methods of FIGS. 5B and 5C. Accordingly, each computing method is selected at random so that such the particular patterns do not appear. According to the experiments performed by the inventors, a natural image with the lease patterns appeared can be obtained by selecting the methods of FIGS. 5A–5C at a weighting ratio of 2:1:3.

Second Stage

A deflection of density occurs momentarily at a certain time during filling up gaps between the dots with dots successively at the first stage. This will be briefly described using a one-dimensional model. It is considered now that the dots are to be arranged on a line with a certain length (e.g. 8 dots). In order to maintain a constant distance between a new dot and other dots as far as possible, the arrangement becomes the following, for example:

1st dot ----•---

2nd dot •---•---

3rd dot •---•-•-

4th dot •-•-•-•-

5th dot •-•••-•-

When the third dot is formed, an inter-dot distance between the center and left dots is equal to 4 dots. To the contrary, an inter-dot distance between the center and right dots is equal to only 2 dots. This difference is double. When the fifth dot is formed, as many as 3 dots are successively arranged near the center. Such a part causes an extremely remarkable pattern when it is seen as a pattern. This is because the dots are intended to form excessive uniformity. In order to resolve this problem, after arranging the dots to some extent, then the formed dots are extended as below:

1st dot ----•---

2nd dot -•--•---

3rd dot -•--•-•-

4th dot -••-•-•-

5th dot -••-•-••

In case of two-dimensional pattern, after the dots are arranged to some extent in dispersion at the first stage, these dots are used as nuclei and are extended in random directions to prevent an island from coupling to each other. The random directions serves to realize smooth halftones without the texture noise that appear in the length and width directions.

Figure 6A:
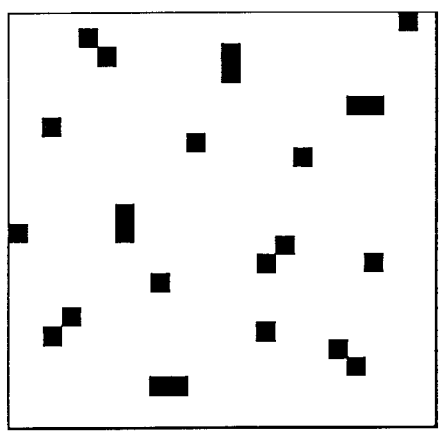
FIG. 6A is a diagram illustrative of a generating process of the pattern.
Figure 6B:
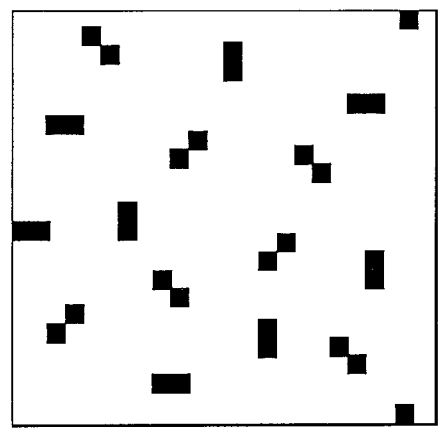
FIG. 6B is a diagram illustrative of a generating process of the pattern.

FIG. 6A shows a state where dots are extended one by one from the original 8 dots. FIG. 6b shows a state where dots are further extended one by one from the next 8 dots. It will be appreciated that dot growth directions are dispersed in length, width and oblique. A dot extension direction is selected from the above directions so that dots are placed in empty area that is as far as possible. The dot can be extended from any part of the island, such as both sides and a central position thereof. The empty directions are obtained by performing the aforementioned distance computing. Thus, the islands are to be grown just before the island couple to each other at the second stage.

Third Stage

Figure 7A:
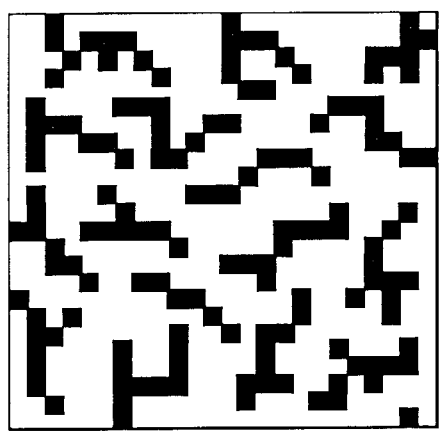
FIG. 7A is a diagram illustrative of a generating process of the pattern.
Figure 7B:
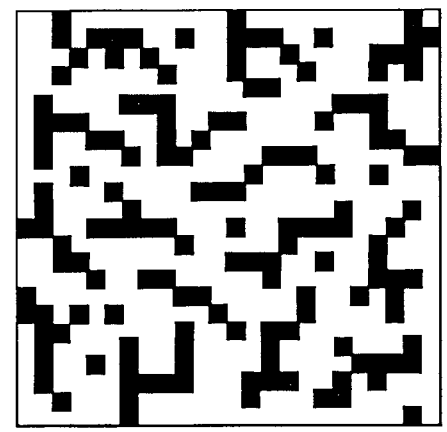
FIG. 7B is a diagram illustrative of a generating process of the pattern.

When the grown island couples to each other, the density varies sharply at that instance, resulting in the irregular density. Accordingly, when the islands are grown just before the island couple to each other, the growth of the island is halted as shown in FIG. 7A, and a new dot is formed at the emptiest space among the islands as shown in FIG. 7B. The new dot serves as a new nucleus for growing an island. This is the third stage. Growing a new island in the above manner may allow the island to couple with each other later. Coupling between the island at relatively higher density levels causes less irregularity than to coupling between the island at lower density levels. Growing dots in such a manner smoothes density variations between respective gray levels and reduces a noticeable pattern and texture noise. Thus, an extremely precise pseudo-halftone expression is achieved.

The matrix of 16×16 dots is exemplified above to meet the convenience of explanation. If a matrix of 128×128 dots is employed to express 256 levels of gray, however, dots are desirably increased on a 64-dot basis per on level from the levels 0 through 16 at random and in dispersion at the first stage. After 1024 dots are formed, using these dots as nuclei, islands are desirably formed at the second stage. If the island is grown in a state where dots are too poor, a probability of coupling the formed dot with other dots becomes undesirably higher. According to the experiments by the inventors, a space of about 16 dots is preferable to grow one island. If m levels of gray are expressed using a matrix of n×n dots in the preferred embodiment of the present invention, it is preferable to form dots on an n×n/m-dot basis accordingly. In this case firstly forming dots are formed until the number of the formed dots reaches at n×n/16 at the first stage and then transferring to the second stage may restrict the island growth within 16 dots.

The dot formation rules may not only be stored as the threshold patterns but also stored directly as fixed dot patterns at respective gray levels. In case of expressing 256 gray levels, it is possible to store only the patterns of the levels 1–128 and employ inverted patterns of the levels 1–127 for the levels 129 and more. In this case, a time for obtaining the patterns and the memory capacity for storing the obtained patterns are reduced to a half of those for all patterns.

The present invention is not limited to the above embodiments. For example, performing each process described above with respect to basic colors can forma a full color image whereas colors of dots are not particularly described with respect to the above preferred the embodiments. In addition, the present invention, which is based on the fixed pattern system, can simplify the computing and process vector data.

As described above, according to the present invention, the number of formed dots within the matrix varies on a multi-dot basis in accordance with gray level variations. In addition, the dots are arranged at random and in dispersion at the first stage so as to separate a dot from each other. The dots are also extended in random directions in turn at the second stage so as to prevent the island of successive dots from coupling with each other. Thus, a smooth an excellent image can be obtained without any regular arrangement and local concentration of dots. The method of the present invention employs a fixed pattern system in accordance with gray levels. Thus, it is possible to realize a high-speed processing without much computation on a dot basis as performed by the error diffusion method and to process vector data easily as well.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A pseudo-halftone image expression method of expressing way levels of n×n/m by varying the number of formed dots within a matrix of n×n dots on an m-dot basis (where n denotes an integer of 8 or more and m denotes any integer), comprising:

a first stage corresponding to each gray level within the matrix in a low gray range using a first dot formulation rule;

a second stage corresponding to each gray level within the matrix in a high gray range using a second dot formulation rule; and a third stage subsequent to said second stage using a third dot formation rule corresponding to gray levels within the matrix:

wherein in the first stage, first dots are arranged at random and in dispersion so as to separate said first dots from each other by the first dot formulation rule;

wherein in the second stage, second dots are extended in directions in turn so as to prevent an island of successive dots from coupling with each other using said first dots arranged at said first stage as a nucleus by the second dot formulation rule; and wherein in the third stage, third dots are arranged in the least dense area so that the third dots are not coupling the island formed at said second stage with each other, and the third dots are extended from a low gray level to a high gray level in turn using one of the third dots as a nucleus by the third dot formulation rule.

2. The pseudo-halftone image expression method of claim 1, wherein a position of said first dot to be arranged within said matrix at said first stage is determined by arranging a plurality of dots at random within said matrix, and repeating predetermined times a process of moving each dot so as to be separated from the nearest dot by a predetermined distance.

3. The pseudo-halftone image expression method of claim 1, wherein a position of said dot to be arranged within said matrix at said first stage is determined to the emptiest among dots already arranged.

4. The pseudo-halftone image expression method of claim 1, wherein said first stage is repeated until n×n/16 dots are formed in the matrix.

5. The pseudo-halftone image expression method of claim 1, wherein a half dot formation pattern is stored in lower gray levels among the whole gray levels to be expressed, and another half dot formulation pattern is determined in higher gray levels as an inverted pattern of said dot formation pattern in said lower gray levels.

* * * * *